United States Patent [19]

Demke

[11] 4,455,554

[45] Jun. 19, 1984

[54] PROPORTIONALITY IN MINATURE DISPLAYS

[75] Inventor: Kent R. Demke, Austin, Tex.

[73] Assignee: International Business Machines Corporation, Armonk, N.Y.

[21] Appl. No.: 227,109

[22] Filed: Dec. 30, 1981

[51] Int. Cl.³ .............................................. G09G 1/16
[52] U.S. Cl. .................................. 340/731; 340/721; 340/745
[58] Field of Search ............... 340/728, 731, 721, 744, 340/745, 723

[56] References Cited

U.S. PATENT DOCUMENTS

| 4,070,710 | 1/1978 | Sukonick et al. | 340/721 |
| 4,090,188 | 5/1978 | Suga | 340/731 |
| 4,168,489 | 9/1979 | Ervin | 340/731 |
| 4,295,135 | 10/1981 | Sukonick | 340/731 |

Primary Examiner—Marshall M. Curtis
Attorney, Agent, or Firm—Andrea P. Bryant

[57] ABSTRACT

In a word processing system having a keyboard display for data entry and modification, and a printer with a choice of pitch, the technique is presented for displaying on less than the entire CRT screen a representation of a full page of text being processed. The full page representation is in fact visually proportional to the yet unproduced printed output. The full page representation is made possible by using a 2×4 character representation structure to represent an 8×16 normal character. Proportionality within the represented data is achieved by displaying particular character representations more than once. The interval between multiply displayed representations is a function of the output pitch with which proportionality is desired and the size of a dot on the CRT screen.

9 Claims, 11 Drawing Figures

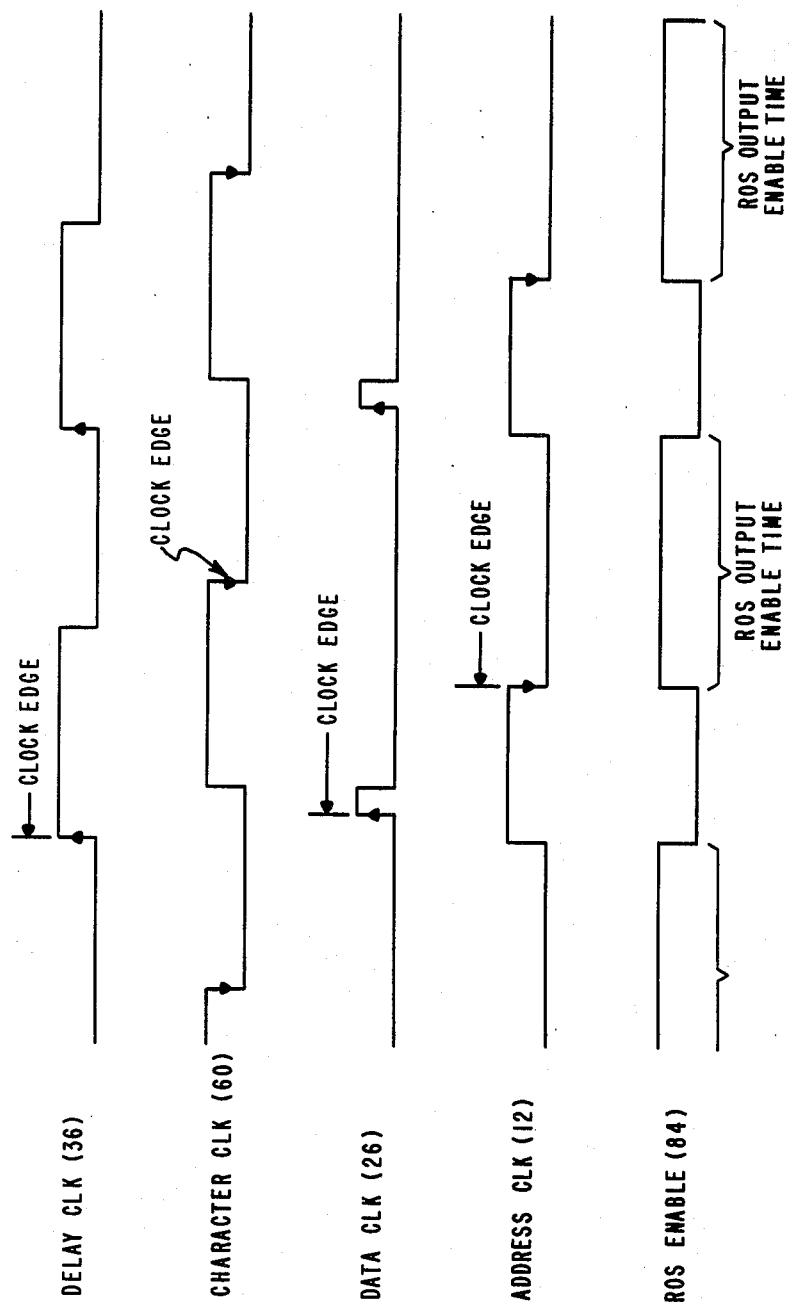

PROPORTIONALITY IN MINATURE DISPLAYS

DESCRIPTION

CROSS-REFERENCE TO RELATED APPLICATIONS

U.S. patent application Ser. No. 219,668, filed Dec. 24, 1980, entitled "Interactive Combination Display", and having K. R. Demke and J. L. Mumola as inventors.

U.S. patent application Ser. No. 221,160, filed Dec. 30, 1980, entitled "Multiple Half-Line Spacing On A Miniature Page", and having K. R. Demke and J. D. Dwire as inventors.

U.S. patent application Ser. No. 221,671, filed Dec. 30, 1980, entitled "A Full Page Representation Through Dynamic Mode Switching", and having K. R. Demke and J. D. Dwire as inventors.

U.S. patent application Ser. No. 219,666, filed Dec. 24, 1980, entitled "Displaying A Full Page Representation", and having K. R. Demke and J. L. Mumola as inventors.

U.S. patent application Ser. No. 219,683, filed Dec. 24, 1980, entitled "Displaying A Proportionally Outlined Miniature Page", and having K. R. Demke and J. L. Mumola as inventors.

BACKGROUND OF THE INVENTION

1. Field of the Invention

This invention relates to word processing systems having a display screen on which a representation of a fully page is displayed. More particularly, it relates to making that full page representation display on less than the entire CRT screen with the text representations displayed in a size proportional to the pitch of their respective text characters upon output printing.

2. Description of the Prior Art

In word processing systems with a display for displaying text as it is entered and edited, an operator is usually unable to display an entire page because of the size of the screen. Often times, however, seeing the entire page may be desirable as it enables the operator to appreciate the proper spatial relationship of a whole page of text to the page boundaries.

One prior art technique for solving this problem is described in U.S. Pat. No. 4,168,489 wherein the actual text characters are compressed for the miniature format display. The height of each character is reduced by utilizing only certain of the rows of vertical dots. Horizontal reduction is accomplished by means of the circuit which decreases the current flowing through the horizontal winding of the cathode ray tube deflection yoke. The lessened current compresses the image width on the visual display screen. That patent also discusses other prior art techniques and points out why they are inappropriate for use in word processing systems with small screen CRT's.

This reference teaches reduction of a page to about one-third its size so as to effectively fill the viewing area of the display. That is, a full page of text is displayed using characters reduced in both the horizontal and vertical dimensions of two-thirds. Not all of the compressed characters are legible. Normal word processing functions can be performed, however.

Another approach can be found in *IBM Technical Disclosure Bulletin* "Abbreviated Character Font Display", Volume 19, No. 9, February 1977, page 3248. That author discloses a technique for displaying significant shapes of characters, words and phrases to allow an operator the ability to quickly access a particular portion of the page without actually reading displayed text.

A different approach is illustrated in *IBM Technical Disclosure Bulletin* article "Combination of Alphanumeric and Formatting Data on the CRT Display", Volume 15, No. 7, December 1972, page 2136. A single dot is used to represent each normally 5×7 dot character. In this technique, the operator can see several lines of text in normal size as well as the total unit of text as represented by dots only. The active window area of the dot only portion of the display is intensified so that the operator can perceive the format relationship of the active text to the entire text. This active window may be moved at the operator's discretion.

U.S. Pat. No. 4,107,664 relates to raster scanned display system in which character size is enlarged in the horizontal dimension by increasing the number of times each dot is sequentially displayed.

OBJECTS OF THE INVENTION

It is therefore an object of the present invention to improve a word processing system operator's appreciation of the spatial relationships of text to full page boundaries.

It is a further object to provide a representation of a full page of text on less than an entire CRT screen.

It is a further object of the invention to provide a representation of a full page of text which is proportional to hard copy output in page size and print pitch.

SUMMARY OF THE INVENTION

These and other objects are accomplished by displaying a miniature character indicator for each character of the full page of text stored in the system memory. Proportionality between the represented text and output pitch is achieved by displaying "padding" character symbols at horizontal intervals within a line. These intervals are chosen as a function of operator indicated desired output pitch as well as the width to height ratio of a dot produced on the display screen. The "padding" character symbols are the result of repeating a displayed character indicator.

BRIEF DESCRIPTION OF THE DRAWING

Other features and advantages will become more clear in connection with the following detailed description of a preferred embodiment taken with reference to the accompanying drawings wherein:

FIG. 3 is a schematic representation of a normal size 8×16 character box.

FIG. 4 is an 8×16 character box showing the placement of 16 2×4 character boxes.

DESCRIPTION OF THE PREFERRED EMBODIMENT

Figure 1:
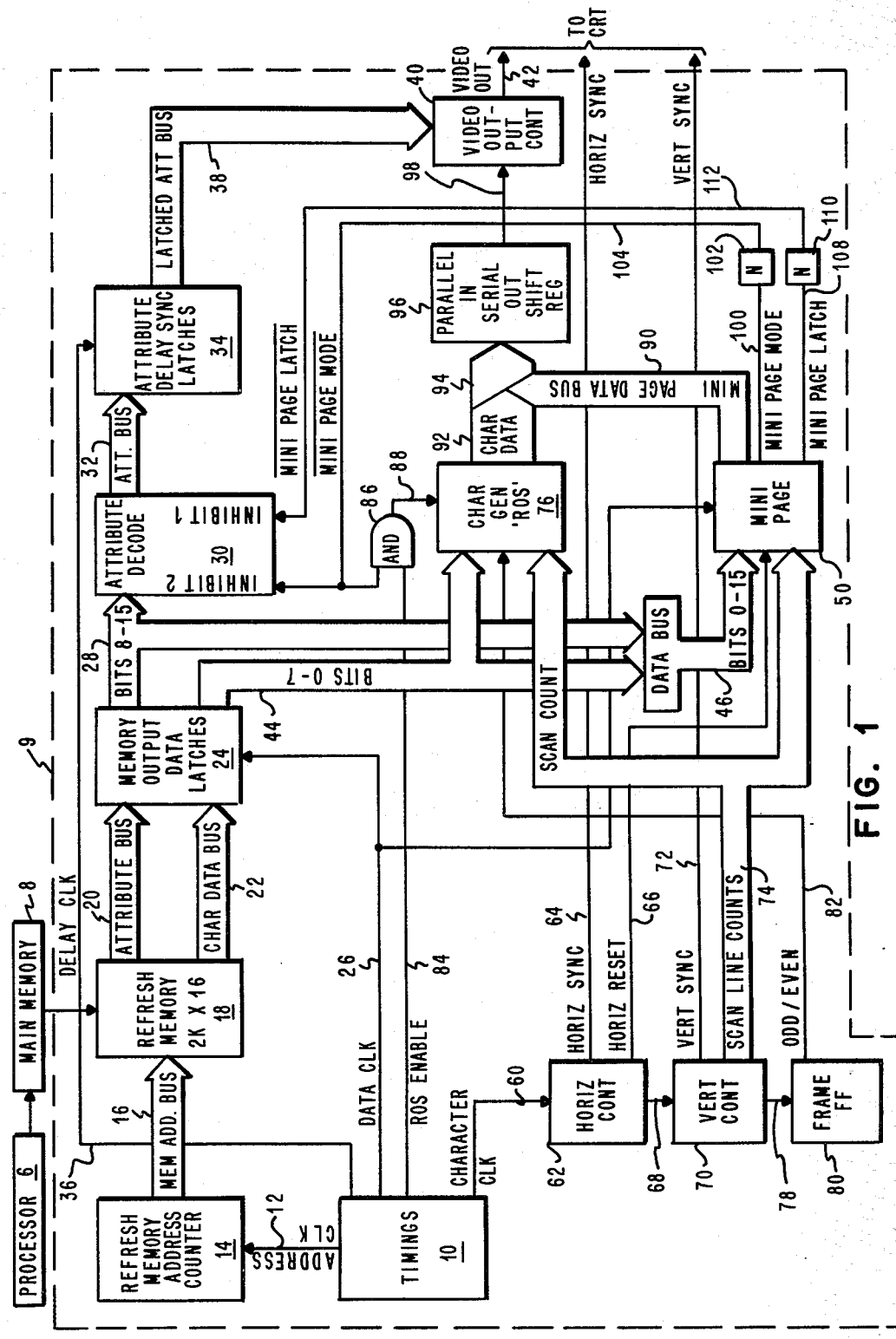
FIG. 1 is a block diagram illustrative of a word processing system in which this invention may be implemented.

FIG. 1 is a block diagram of a typical implementation of a word processing system in which our invention is embodied. The illustrated system includes processor 6, main memory 8, a display and a display interface logic 9. Only those connections between processor 6, main memory 8 and display interface logic 9 are shown as needed for purposes of explanation of our invention. Other interconnections therebetween are conventional and well understood by those skilled in the art.

Figure 10:
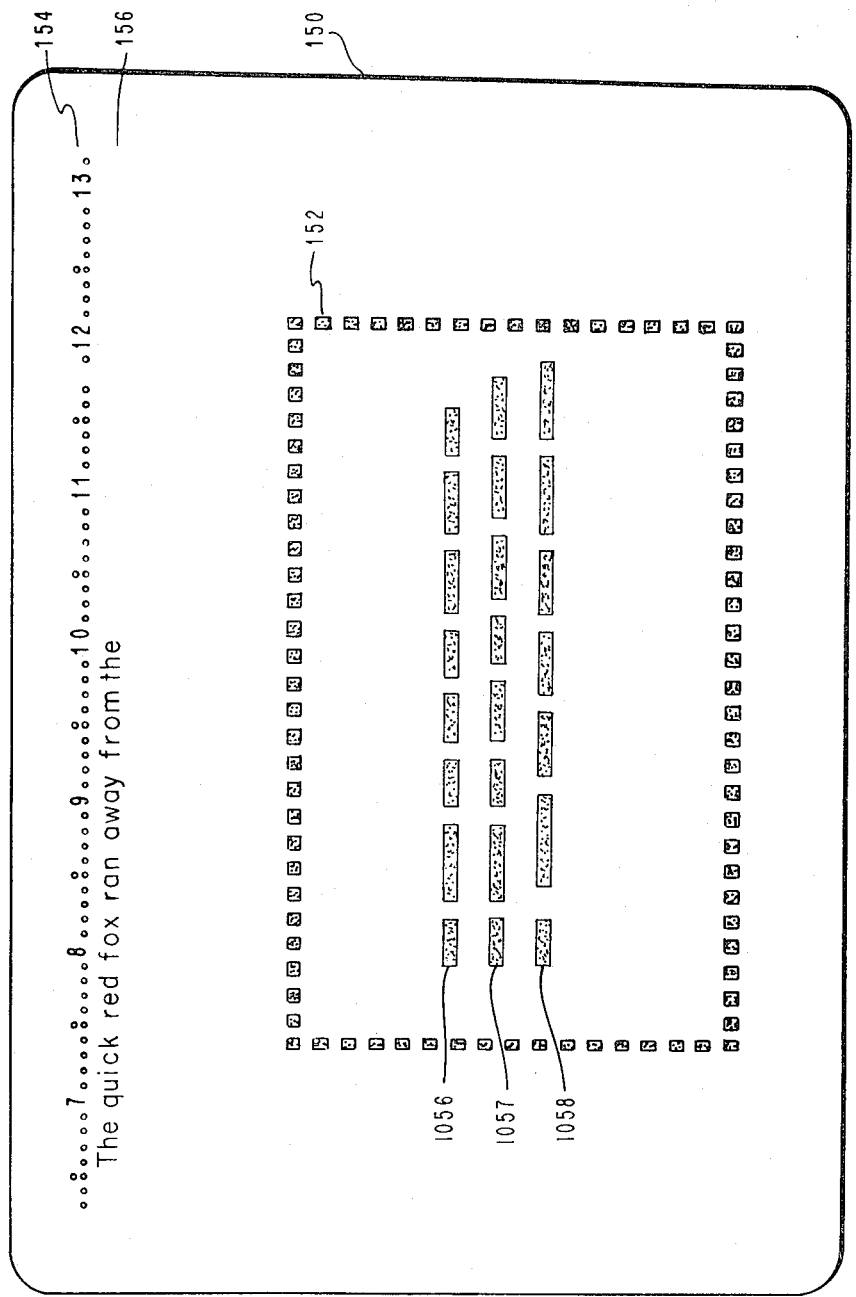
FIG. 10 shows the time relationship of the signals output from timing generator 10 in FIG. 1.

Timing generator block 10 provides various clocking signals for the word processing system illustrated. The wave forms of the signals output by timing generator 10 are illustrated in FIG. 10. The address clock signal on line 12 is input to refresh memory address counter 14 whose output appears on memory address bus 16. The address placed on bus 16 by processor 6 is input to the refresh memory 18. Attribute bus 20, as well as character data bus 22, are two outputs from refresh memory 18. The data on both 20 and 22 are latched into memory output data latches 24. Another clock signal from timing generator block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The latched attribute data is output on bus 38 to video output control 40, the output of which on line 42 is the video input to the CRT monitor (not shown). The other eight bits of character data are output from memory output data latches 24 along bus 44. The total 16 bits of character information from latches 24 on the two buses 28 and 44 are joined in data bus 46 prior to being input to miniature page generator 50. Miniature page generator 50 also receives from timing generator 10 data clocking signals along line 26.

The character clock signal on line 60 is also output from timing generator 10. Character clock signals on line 60 are input to horizontal control 62 which generates horizontal synchronization signals on line 64 which is one input to the CRT monitor (not shown). Also generated in horizontal control 62 are horizontal reset signals on line 66. Horizontal reset signals on line 66 are input to miniature page generator 50 for reasons which will become clear as this description progresses. Vertical clock signals are generated in horizontal control 62 and are passed along line 68 to vertical control 70. Vertical control 70, in a conventional manner, generates vertical synchronization signals along line 72 for input to the CRT monitor. Vertical control 70 also generates counts of lines displayed on bus 74. Line count bus 74 is input to both miniature page generator 50, for purposes which will subsequently become clear, and to character generator storage 76. Vertical control 70 generates frame clock signals on line 78 which are input to frame flip-flop 80. Frame flip-flop 80 generates odd/even signals indicative of frame status in interlaced scanning terms and passes them along line 82 to character generator storage 76.

Character generator storage 76 also has an input from bus 44. Timing generator 10 generates the character generator storage enable signal along line 84 which is gated through AND gate 86. The signal arising in AND gate 86 passes along line 88 to character generator storage 76.

Miniature page generator 50 has three outputs. The first is the miniature page data bus 90 which is DOT-OR'D with the character data bus 92 from character generator 76. Either bus 90 or bus 92 data, as will become clear, is on bus 94 which is input to parallel to serial shift register 96. Serial data is output on line 98 to video output control 40. Another output from miniature page generator 50 is the miniature page mode signal on line 100 which is inverted by inverter 102. The inverted value on line 104 is an input to both attribute decode logic 30 as well as to AND gate 86. The final output of miniature page generator 50 is the miniature page latch signal on line 108 which is inverted by inverter 110. The inverted value of the miniature page latch signal on line 112 is the other input to the attribute decode 30.

Miniature page generator 50 is a key element of the system in which the present invention is implemented. Miniature page data to be displayed on the screen is written into refresh memory 18 using conventional write operations which form no part of the present invention. Once an operator has indicated to a system employing our invention a desire to display a miniature representation of a page, conventional techniques are used to read characters from the main or system memory 8 and to store "1"s for characters and "0"s for spaces in groups of 16 bits in display refresh memory 18.

Figure 2:
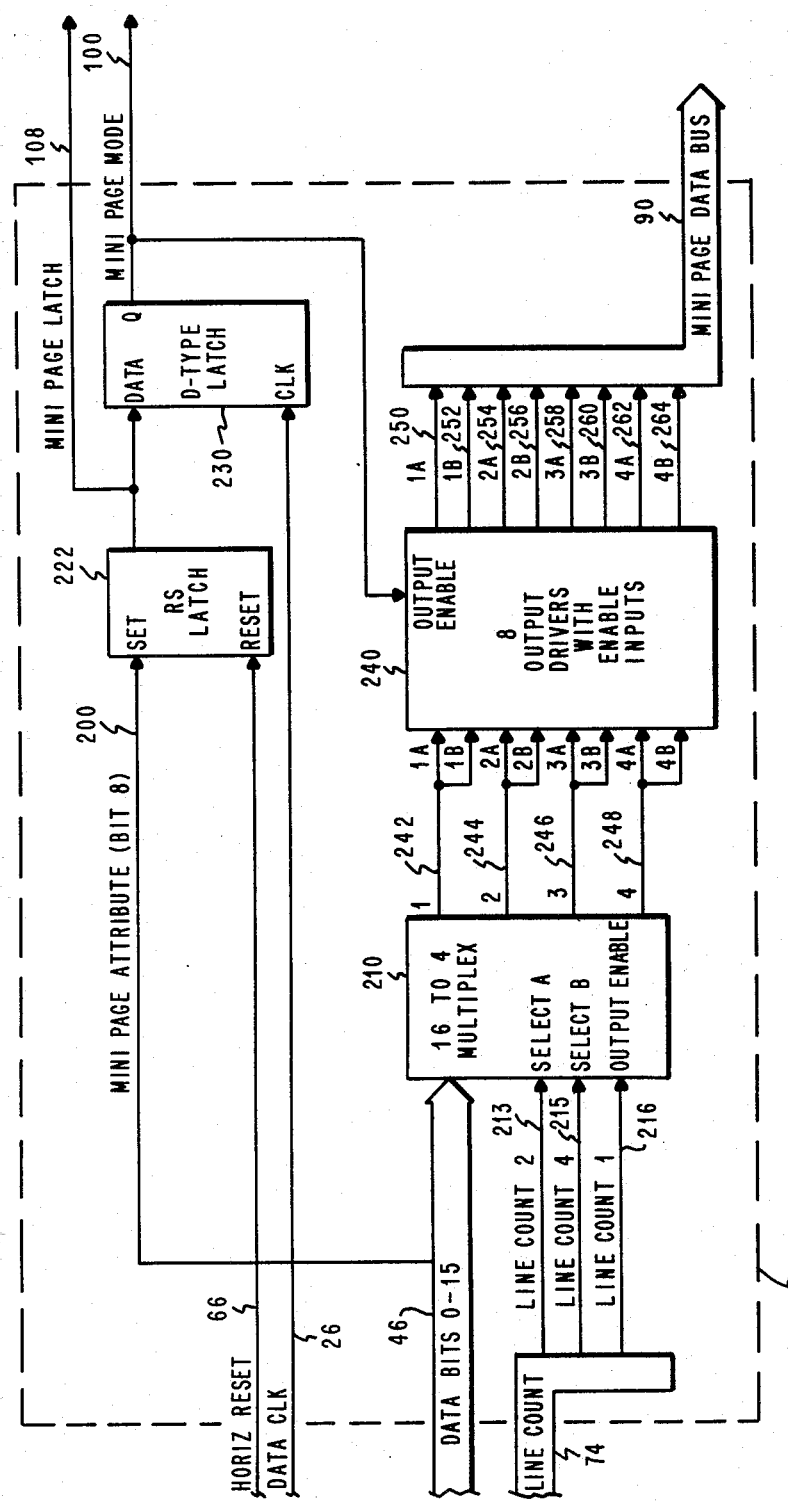
FIG. 2 is a more detailed diagram of logic performed in miniature page generator 50 of FIG. 1.

Referring now to FIG. 2, internal logic of miniature page generator 50 is shown in a greater level of detail. One of 16 data bits on bus 46, bit 8, is the miniature page attribute and is placed on line 200 to set RS latch 222. The reset input for RS latch 222 is provided by horizontal reset signal on line 66. The output of RS lach 222 is the miniature page latch signal on line 108 which, as will be recalled, is inverted and then used as an inhibit input to attribute decode logic 30 of FIG. 1. Line 108 is also the data input to D Type latch 230. The clock input to latch 230 is the data clock signal on line 26. The output of D latch 230 is the miniature page mode signal on line 100 which, after inversion, is applied as the other inhibit input to attribute decode 30 of FIG. 1.

Bus 46, carrying 16 bits of data is applied to 16 to 4 multiplexer 210. Multiplexer 210 is provided to divide the 16 data bits on bus 46 into four groups of four. Scan line counts 2 and 4 on lines 213 and 215, respectively, are taken from scan line count bus 74. Scan line count 2 provides a Select A input and scan line count 4 the Select B input to multiplexer 210. The particular four bits taken from bus 46 are a function of the states of scan line counts 2 and 4. Scan line count 1 on line 216 is the output enable signal for multiplexer 210.

Each group of four bits is broken down one bit each on lines 242, 244, 246, 248, respectively, on output multiplexer 210. Those lines, 242, 244, 246, and 248 are fanned out so that each one provides two input to a block of eight output drivers 240. When the miniature page mode indicator on line 100 is up, it enables output from the eight output drivers comprising block 240. The two bits derived from the one bit on line 242 are output on lines 250 and 252. Similarly, the two bits from line 244 are output on 254 and 256, the two from line 246 on lines 258, 260, the two from line 248 on lines 262 and 264. These eight bits make one parallel word or byte of data on miniature page data bus 90 which provides an input to parallel to serial converter 96.

The serial output from shift register 96 is provided to video output control in the conventional manner for display on the CRT. Thus, the single bit stored in refresh memory 18 as a result of examining the data in the system main memory is changed to double dots in a 2×4 character box for output in the miniature page mode.

Figures 3, 4:
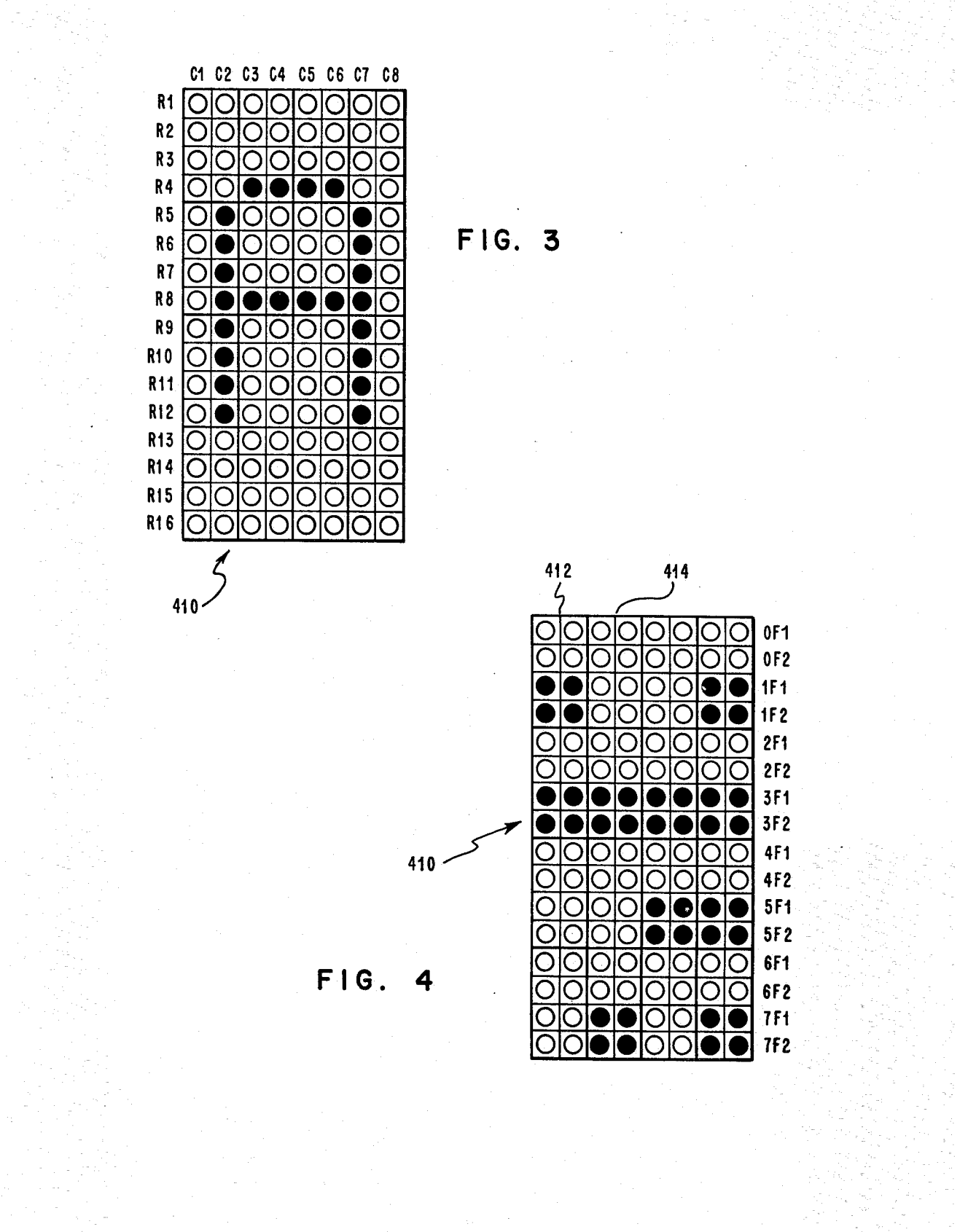

FIG. 3 is a schematic illustration of a normal size character box 410 as contemplated in the present invention. In our exemplary embodiment, this character box is 8×16, eight columns wide and 16 rows high. Rows are denoted R1 through R16; and columns, C1 through C8. A conventional CRT using interlaced scanning, as is well known in the art, can display dot matrix characters 8 dots by 16 dots high. Not all of these individual matrix positions are usually used for a given character. A regular character may, for example, be contained in rows 4 through 12 with the unused space being reserved for sub- and superscripts, and/or interline spacing. Columns 2 through 7 may be used for dots, and unused columns for inter-character spacing.

FIG. 4 shows how that same 8×16 matrix 410 can be divided into 16 2×4 miniature character representations boxes. In this manner we are able to display four characters for each of four consecutive lines in the space normally occupied on a CRT screen by a single, normal size character. It is to be especially noted that our miniature display is not a display of characters, but of character representations which enable an operator to comprehend format and spatial relationships on the page being processed.

It is the character representation structure which permits miniature page display with minimal hardware impact. The use of interlaced scanning is advantageously combined with that structure. In interlaced scanning half of the alternating horizontal lines are scanned. These may be referred to as Field 1. The other half of the horizontal lines, alternating with Field 1 lines, are then scanned. These lines are referred to as Field 2. Scan Fields 1 and 2 are interlaced. In FIG. 3, the 16 rows are designated as ∅F1, 1F1, 2F1 . . . 7F1 or ∅F2, 1F2, 2F2, where F1 and F2 indicate scan Fields 1 and 2, respectively.

We use the convention that ∅ is an even number. It can be seen that the even rows of both Fields 1 and 2 are blank, i.e., not dotted. In each of the 16 separate character representation boxes, these even rows are the topmost two rows. The bottom two rows in each box represent characters or spaces. Boxes like 412 are characters. Those like 414 are spaces.

Figure 5:
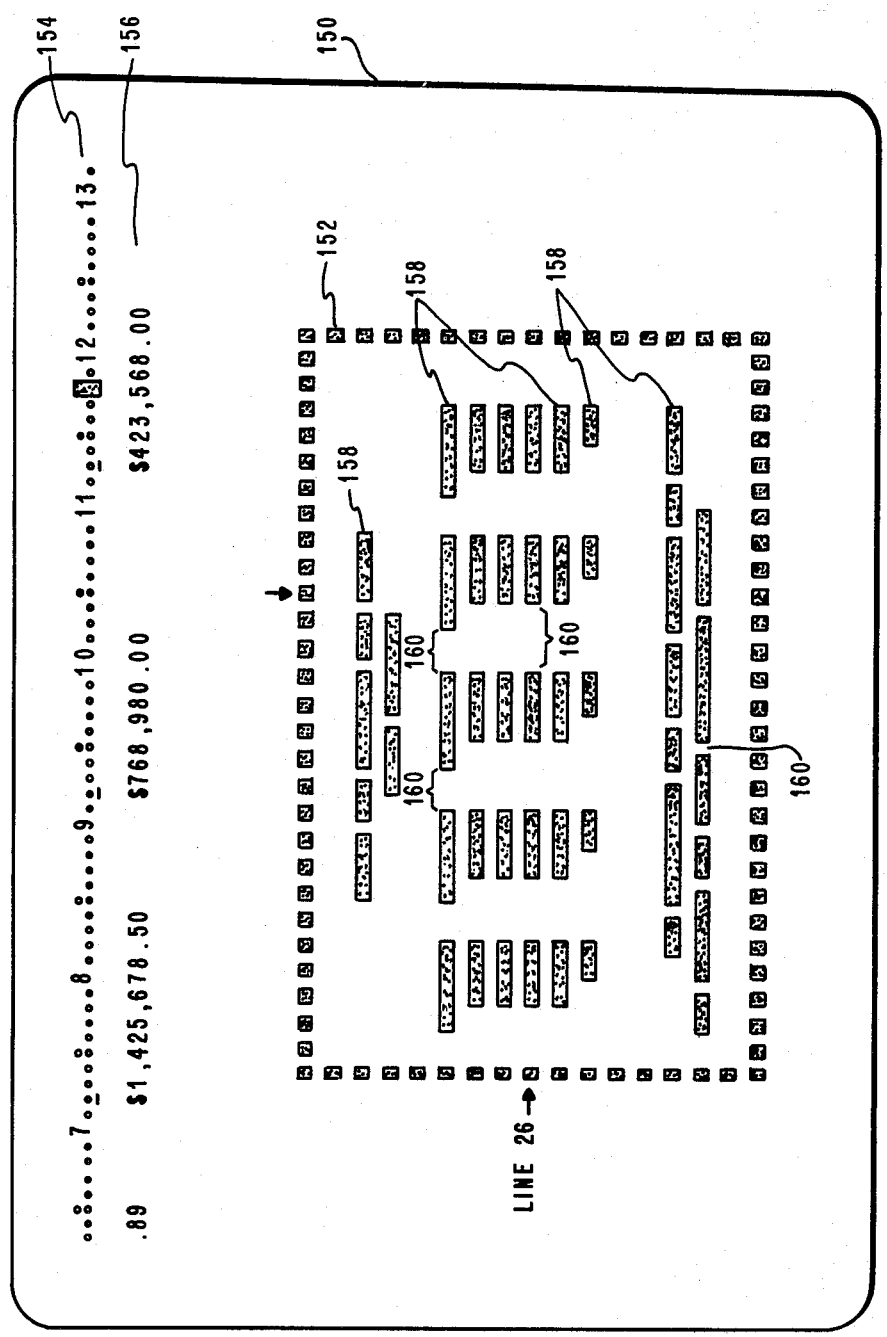
FIG. 5 is a schematic illustration of a display screen on which is displayed a result of this invention.

FIG. 5 shows CRT screen 150. Indicated generally at 152 is a miniature full page representation for showing format and layout of the page being processed. Indicated generally at 154 is the scale line, and at 156 the active cursor line, that is, the text being entered or modified. Within miniature page representation 152 thick line segments 158 comprise a plurality of adjacent character representations 412 as shown in FIG. 4. Spaces 160 consist of space representations 414 as shown in FIG. 4.

In a conventional manner cursor position with page representation 152 may be identified by blinking the particular miniature character representation corresponding thereto.

Figure 6:
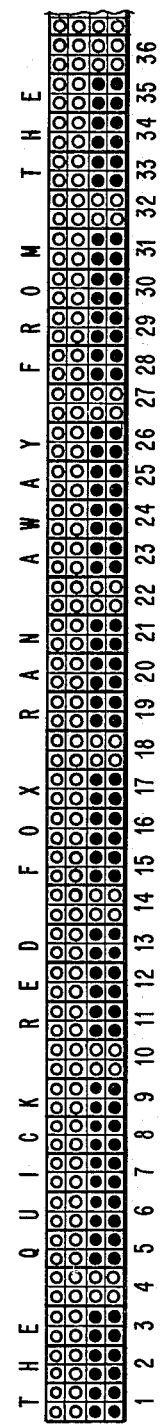
FIG. 6 is an illustration of a portion of a line of text represented using the 2×4 character boxes,.

In FIG. 6 there can be seen an enlargement of a portion of a line from a miniature page representation such as 152 of FIG. 4. Not shown in FIG. 6 are the portions of the displayed line which comprise the vertical page outlines. FIG. 6 illustrates how the text, "THE QUICK RED FOX RAN AWAY FROM THE," would be represented using our character indicator construct. Text represented in this manner is adequate for comprehending spatial information of what is stored in memory. However, in sophisticated word processing systems with keyboard entry and display, and a relatively remote printer, the operator is given a menu with several options for output such as page size, line spacing, and print pitch.

With a horizontally scanned display, the dot spacings are normally longer in the vertical direction than the horizontal direction. For the particular display screen with which our invention is described the width of a dot is 0.32 mm; and the height, 0.34 mm. This 0.02 mm difference causes a miniature page representation to be out of proportion by being long and skinny. In this particular embodiment it has been found that a 10 and 12 pitch page can be displayed on the CRT proportional to actual size by outputting a "padding" character at fixed intervals as needed. These intervals are a function of the pitch and the width to height ratio of a dot. In general, the appropriate padding interval is determined using the width to height ratio of dot and the area of the display screen.

Figure 7:
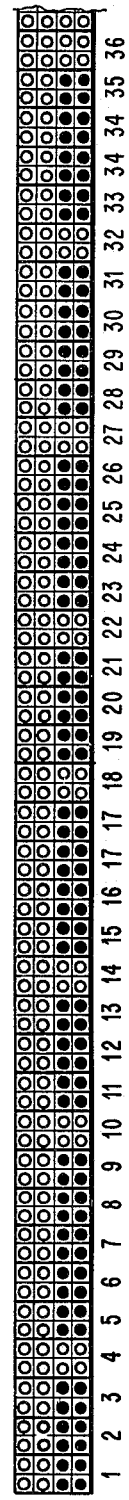
FIG. 7 is the text representation of FIG. 5 as modified for 12 pitch proportionality.

Refer now to FIG. 7 which shows the same text representation from FIG. 6, but modified so as to be proportional with 12 pitch output. Again it is to be noted in FIG. 7 that the character indicator which would comprise part of the outline is not shown. Comparing FIGS. 6 and 7, it can be seen that the 17th character which is "X" is represented twice in FIG. 7. Also, the 34th character, which is "H", is output twice. This is because the width to height ratio for the particular CRT described in this embodiment requires doubling every 17th character indicator to assure proportionality with a 12 pitch printout. Since these are not real characters, but merely representations of characters, and every line has the same numbered character indicator output twice, columns such as those indicated in FIG. 5 remain aligned.

Figure 8:
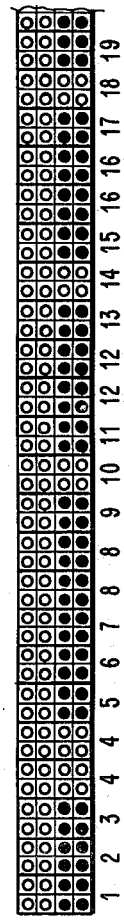
FIG. 8 is the text representation of FIG. 5 as modified to be proportional to 10 pitch output.

Similarly, FIG. 8 is the same text representation of FIG. 6 modified to be proportional to 10 pitch output. Once again it is to be noted that the portion of the text line comprising the vertical page outline has been omitted. For the CRT of this embodiment it has been found that the duplication of every fourth character will assure proportionality with 10 pitch output. So as illustrated in FIG. 8, the fourth character of FIG. 6, a blank, is output twice. Likewise, the "C" of QUICK, the "E" of RED, the "O" of FOX, and so forth are output twice.

As was just described with reference to FIG. 7, the miniature page representation displayed is proportional not only to a hard copy, but it also gives an operator a full understanding of the relationship of the text to page boundaries for formatting purposes. Obviously, this same concept could be applied to other CRT's with different sized dots, and using some scanning technique other than that described.

OPERATION OF THE INVENTION

When the miniature page mode is desired to be entered, a particular bit is set in the attribute byte of the last character space before the miniature page is to be displayed. The system is structured such that when a miniature page mode is entered on a given line, the rest of the line is in miniature page format. Up to that point on the line, full size text may be displayed; however, it will be recalled that in this particular system a full size character is placed in an 8×16 character box and that the character construct used in the miniature page mode is 2×4 character box. Sixteen miniature page character representation constructs fit in the space normally occupied by a full size character so that in one full size character box four characters from four lines which will be sequential lines are displayed.

When the data is examined in the system or main memory 8 of FIG. 1 and one bit stored in the display or refresh memory 18 for each character or space, a given storage location of 16 bits is arranged so that there are four groups of four bits representing four characters or spaces from four different lines.

Referring again to FIG. 1, the overall block diagram of the display word processing system including our invention, normal data flow when only full size text is to be displayed is from the main memory 8 to the refresh memory 18. The attribute byte on bus 20 which normally governs such things as cursor, blinking, reverse video, attribute goes to the video control 40; and the data byte on bus 22 is used to access the character generator storage 76 so that the correct code is sent over busses 92 and 94 to parallel to serial converter 96 and thence to video control 40. When in the miniature page mode, however, there is but one attribute for the remainder of the line and once that has been detected the hardware is switched so that the path of the attribute data to the video control 40 is blocked and the path of the data bus through the character generator storage 76 is blocked.

Rather both attribute and data busses 20 and 22 are placed along one bus 46 which goes through the miniature page generator 50 and thence to the parallel to serial converter 96 via busses 90 and 94 and thence to the video control 40. It will be recalled from the discussion of FIG. 2, a more detailed diagram of the miniature page generator, that the one bit stored in the refresh memory 18 for each character or space is doubled for input to output driver block 240 and thence output to the parallel data bus 90 which is serialized and sent to the video control for display on the screen.

Figure 9A:
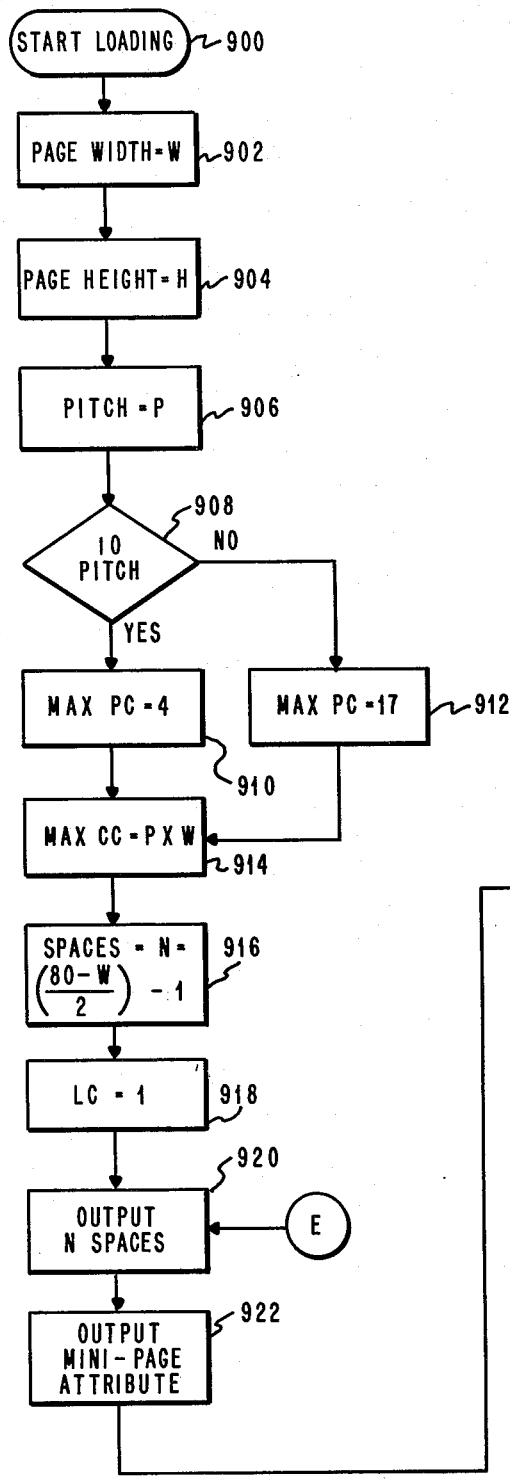
FIGS. 9A and 9B are a logic flow diagrams for producing text representations as shown in FIGS. 7 and 8.
Figure 9A:
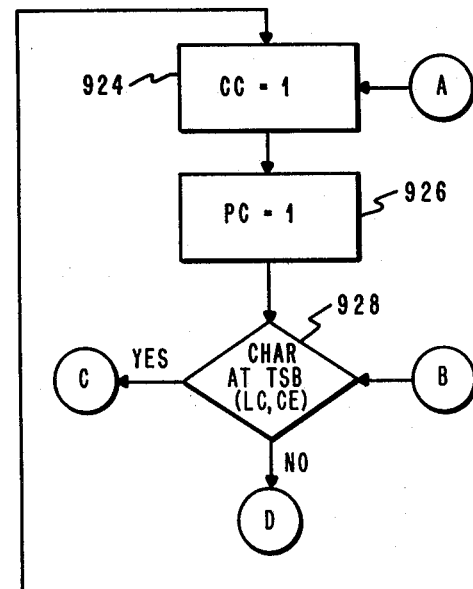
Figure 9B:
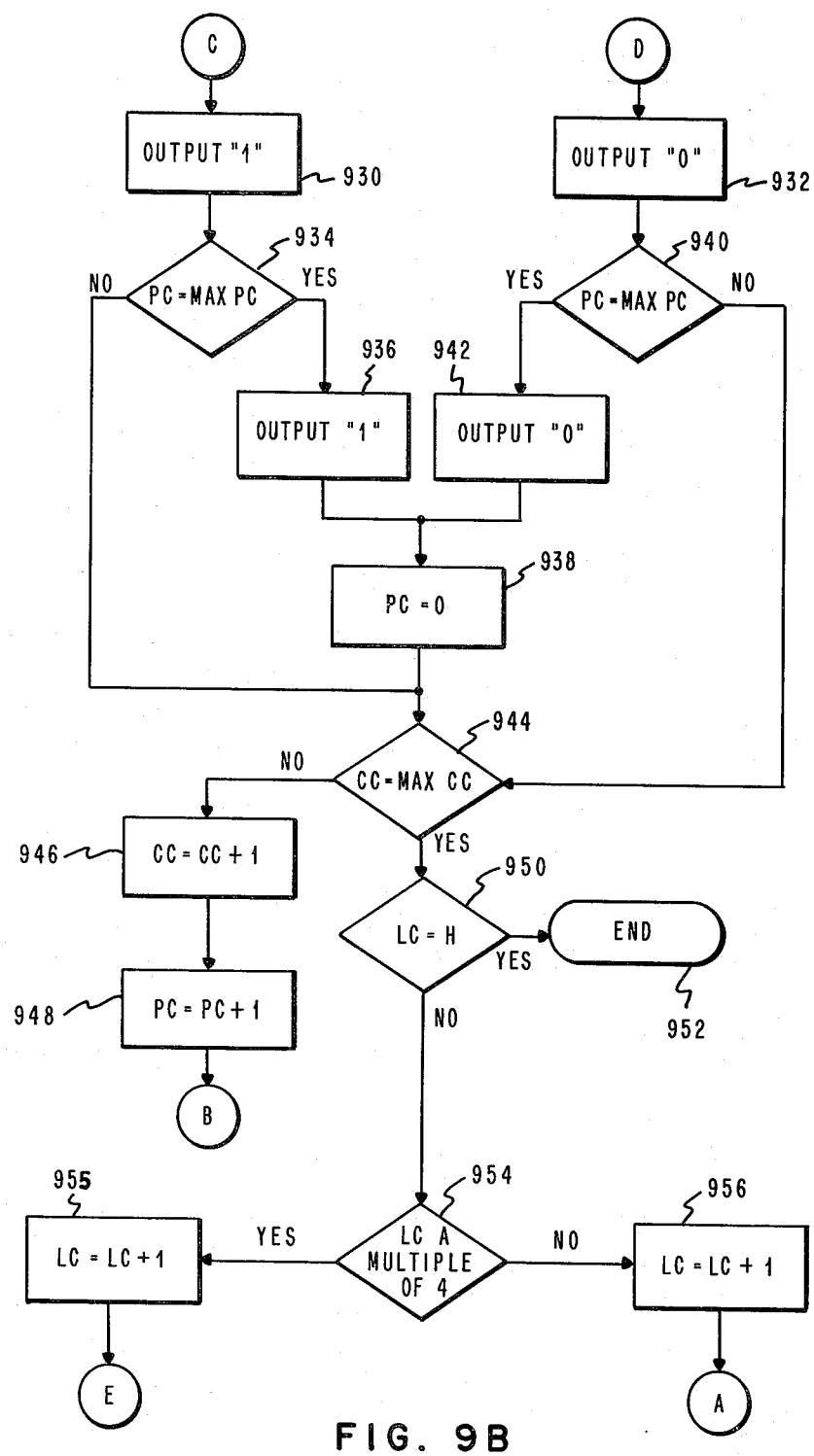

FIG. 9 is a flow chart of the logic used in loading output with proportional miniature page data into the screen refresh memory 18, FIG. 1. This routine is entered at start as indicated at 900. At block 902, the user indicated page width "W" is taken from the menu. Page height "H", also input by the user, is retrieved by the processor 6 of FIG. 1 at block 904. Similarly block 906, processor 6 in FIG. 1 takes the user indicated pitch "P" from the menu. This description based on a choice between only 10 and 12 pitches. It will, of course, be obvious to those skilled in the art that routines for maintaining proportionality with other output pitches would be developed along similar lines.

Decision block 908 determines whether the user desires 10 pitch. If so, the maximum pad character count, MAXPC, is set to the valve 4. As just stated this exemplary logic flow is provided for 10 and 12 pitch only. Therefore, the assumption is made that if the user has not indicated 10 pitch that 12 pitch is a default and the maximum pad character count MAXPC is set to 17 of block 912.

In view of the discussion of FIGS. 7 and 8 it will be recalled that pad character count is the interval between repeated character representations on output. In either pitch after setting MAXPC, the maximum character count is calculated at block 914 to be equal to the pitch, that is 10 or 12, times page width "W". At block 916, the number of spaces which will remain available on the screen 150, FIG. 5 to the left of the miniature page representation 152, assuming that it is centered on the display area, is calculated to be 80 minus "W" width over 2, quantity minus 1. Again, the constant 80 is used because the particular display in our exemplary embodiment is 80 characters wide. It is, of course, obvious to those skilled in the art how it implement a technique such as ours on a screen of a different size.

At block 918 a miniature page line count LC is initialized to one, and the processor loads the previously calculated N spaces into the display refresh memory 18 FIG. 1) in block 920. Then the processor 6 (FIG. 1) causes the miniature page attribute to be loaded into refresh memory 18. Character count (CC) is initialized to one in block 924 was to enable the processor to maintain the current count of character representations output in a given line. Similarly, at block 926, pad character count is initialized to one.

At block 928 the processor determines whether there is a character at the location in the text storage buffer portion of system main memory 8 indicated by the coordinates line count (LC), character count (CC). That is, at a given character position within a given line in text storage buffer, is there a character or a blank? If there is a character, the processor at block 930 causes a one to be output to refresh memory 18. If there is no character in that particular location in the text storage buffer portion of the main memory 8, then the processor outputs a zero to refresh memory 18 at block 932.

At block 934 after having output a one to refresh memory 18 the processor determines whether pad count has reached the value of maximum pad count at decision block 934. If it has, then another one is output to display buffer at block 936. In other words if we are in 10 pitch where we duplicate every fourth character, then pad count equals four. Then pad count is then reset to zero in block 938. Similarly at block 940, which is reached after outputting a zero to refresh memory 18 which causes a blank to appear on the screen, the pad count is compared with maximum pad count. If there is a match, the processor at block 942 outputs another zero to refresh memory 18. Pad count is then reset to zero at block 938.

In either event, that is after the placement of a one or zero in refresh memory 18, the processor determines at decision block 944 whether character count in the current line has reached the maximum character count. If it has not, character count is incremented by one in block 946, pad count is incremented by one in block 948, and the processor returns to decision block 928 to determine the presence of a character at the corresponding location in the buffer portion of main memory 8.

If on the other hand, character count has reached the value of maximum character count then at block 950 processor 6 determines whether the current line count is equal to the user indicated page height and if so, the routine terminates at 952. If the full page has not yet been loaded for display as indicated by line counts being unequal to page height, then at decision block 954 the processor 6 determines whether the line count is an integral multiple of 4. If so, it increments line count at block 955 by 1 meaning that the equivalent of one normal character block size (8×16) line has been loaded into the memory 18 ready for output. Control then returns to block 920 where N full size spaces are loaded into refresh memory 18. If, however, line count is not an integral multiple of four, line count is incremented by one at block 956 and the processor returns to block 924 and sets character count equal to one to indicate the beginning of a new miniature page line. Refer now to FIG. 10 which is somewhat a composite of FIGS. 5, 6, 7 and 8 in that the screen layout of FIG. 5, including a scale line 154, an outlined miniature page outline 152 and three sets of character representation constructs 1056, 1057 and 1058 corresponding to FIGS. 6, 7 and 8, respectively. The line of text 156 which character representation constructs sets 1056, 1057 and 1058 represent is shown. Each of the sets represent those same words. The character representation constructs at 1056 have a one-to-one correspondence to line of text 156. However, character representation constructs at 1057 represent the same text modified so as to be proportional with 12 pitch printing. That is, as discussed above, every 17th character representation construct has been repeated. Similarly, character representation constructs at 1058 represent the same text as 156 but now modified to be spatially proportional to output printed in 10 pitch with every fourth character representation construct or absence thereof, repeated. It can be appreciated that an operator of a word processing system embodying the present invention will have a better understanding of the way final copy will appear when printed.

While we have described a particular embodiment of our invention, it is, of course, obvious to those skilled in the art that certain changes in form and detail may be made such as to accommodate different CRT screen sizes or other such details without departing from the scope of the invention.

What is claimed is:

1. For use in a word processing system including a keyboard, a display, a main memory, a display memory, and a printer with multiple pitch options, the improvement in text display method comprising the steps of:
    (1) displaying at least a portion of at least one full size line of text;
    (2) at the same time as step 1, displaying a miniature full page representation comprising miniature character indicators arranged to reflect format of the represented text; and
    (3) varying the horizontal spacing between miniature character indicators within the miniature full page representation in accordance with the pitch chosen.

2. The method of claim 1 wherein the horizontal spacing between the miniature character indicators is varied as a function of the ratio of the width to height of a dot on said display.

3. The method of claim 1 wherein the said horizontal spacing between the miniature character indicator is varied as a function of the pitch chosen and the width to height ratio of a dot on the display screen.

4. The method of claim 3 wherein the varying step includes multiple display of every Nth character indicator, N having a predetermined value as a function of output pitch, and the width and height of a dot on the display screen.

5. In a system including a display having interlaced scanning, a keyboard, a system memory in which text data is entered and modified, and a display memory for refreshing the display, improved text processing apparatus for displaying a properly formatted and proportional to an actual page miniature full page representation on less than the entire display including:
    means for storing the display memory an indicator for each character in the text in said system memory;
    means for displaying miniature character symbols as a function of scan number and the value of the indicator in said display memory;
    means for monitoring the number of character indicators during display; and
    means responsive to an operator chosen pitch for printing for varying the spacing between miniature character symbols by multiply displaying every Nth miniature character symbol, where the value of N is determined as a function of the pitch chosen, and the width and height of a dot on the CRT screen.

6. The system of claim 5 wherein said miniature character symbols are formed in a matrix which is in size an integral fraction of a full size character matrix.

7. Apparatus for use in a word processing system including a keyboard, a display, a main memory, display memory, and a printer with multiple pitch options, the improvement for text display comprising:
    (1) means for displaying at least a portion of at least one full size line of text;
    (2) means for displaying simultaneously with said portion of said full size line a miniature full page representation comprising miniature character indicators arranged to reflect format of the represented text; and
    (3) means for varying the horizontal spacing between miniature character indicators within the miniature full page representation as a function of the pitch chosen.

8. The apparatus of claim 7 wherein the means for varying further includes means for varying the horizontal spacing as a function of the ratio of the width to height ratio of a dot on said display.

9. The apparatus of claim 7 wherein the means for varying includes means for producing the multiple display of every Nth character indicator, N having a value predetermined as a function of the chosen pitch and the width and height of the dot on the display screen.

* * * * *

UNITED STATES PATENT AND TRADEMARK OFFICE
CERTIFICATE OF CORRECTION

PATENT NO. : 4,455,554
DATED : 19 June 1984
INVENTOR(S) : K. R. Demke

It is certified that error appears in the above—identified patent and that said Letters Patent is hereby corrected as shown below:

In the title on the title page delete "MINATURE" and substitute "MINIATURE".

In the title Column 1, line 2 delete "MINATURE" and substitute "MINIATURE".

Column 3, before line 3 insert --FIG. 10 is a composite of FIGs. 5, 6, 7 and 8.

Column 3, line 3 delete "10" and insert therefor --11--.

Column 5, line 61 after position delete "with" and insert therefor --within--.

Signed and Sealed this

Eleventh Day of December 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,455,554

DATED : June 19, 1984

INVENTOR(S) : Kent R. Demke

It is certified that error appears in the above-identified patent and that said Letters Patent is hereby corrected as shown below:

Title page of patent, please delete filing date of "Dec. 30, 1981" and insert --Dec. 30, 1980--.

Signed and Sealed this

Second Day of June, 1992

*Attest:*

DOUGLAS B. COMER

*Attesting Officer*      *Acting Commissioner of Patents and Trademarks*